May 2, 1961     K. C. STEWART     2,982,914
NOISE METER
Filed April 25, 1955     2 Sheets-Sheet 1
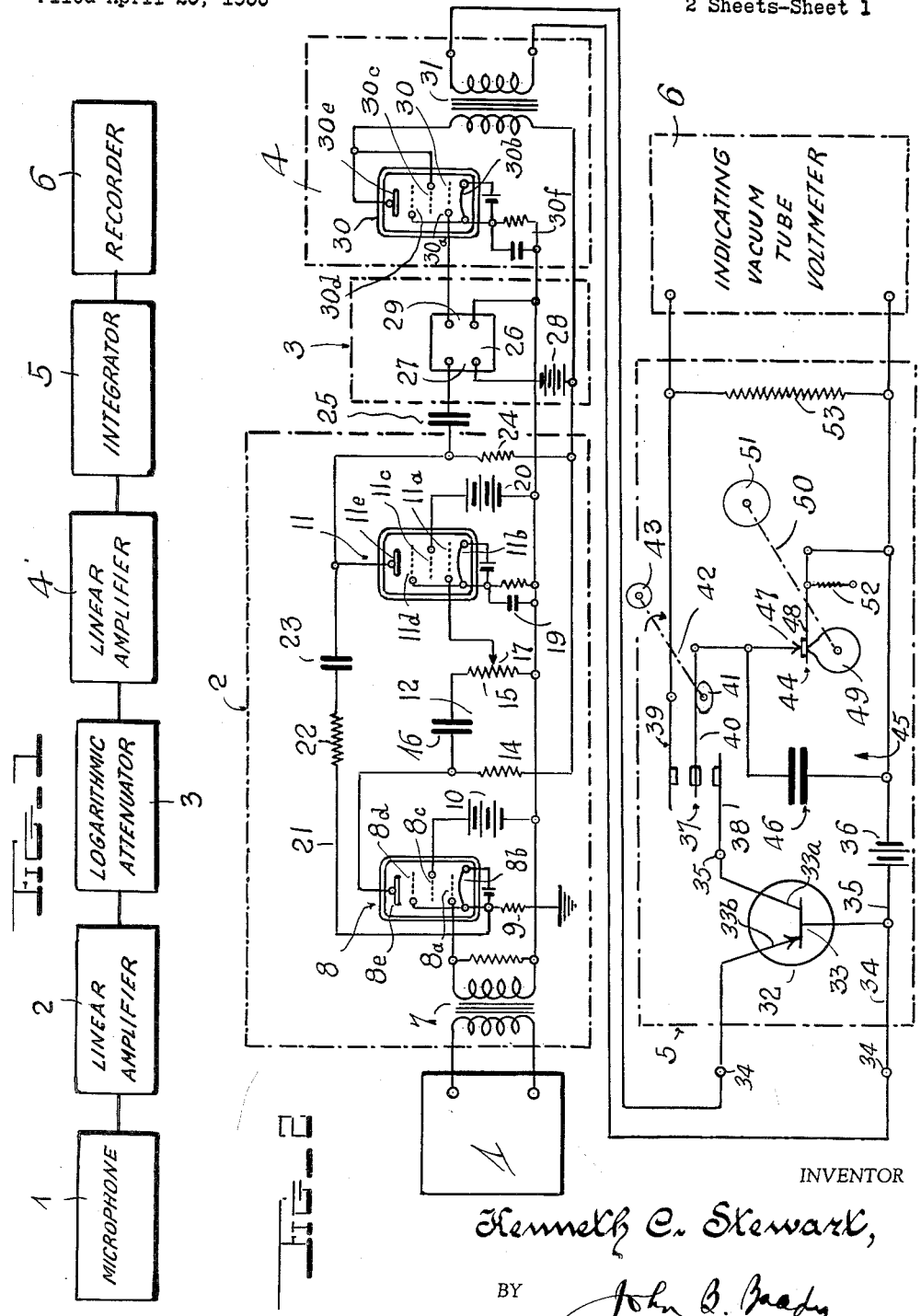
INVENTOR
Kenneth C. Stewart,
BY John B. Brady
ATTORNEY

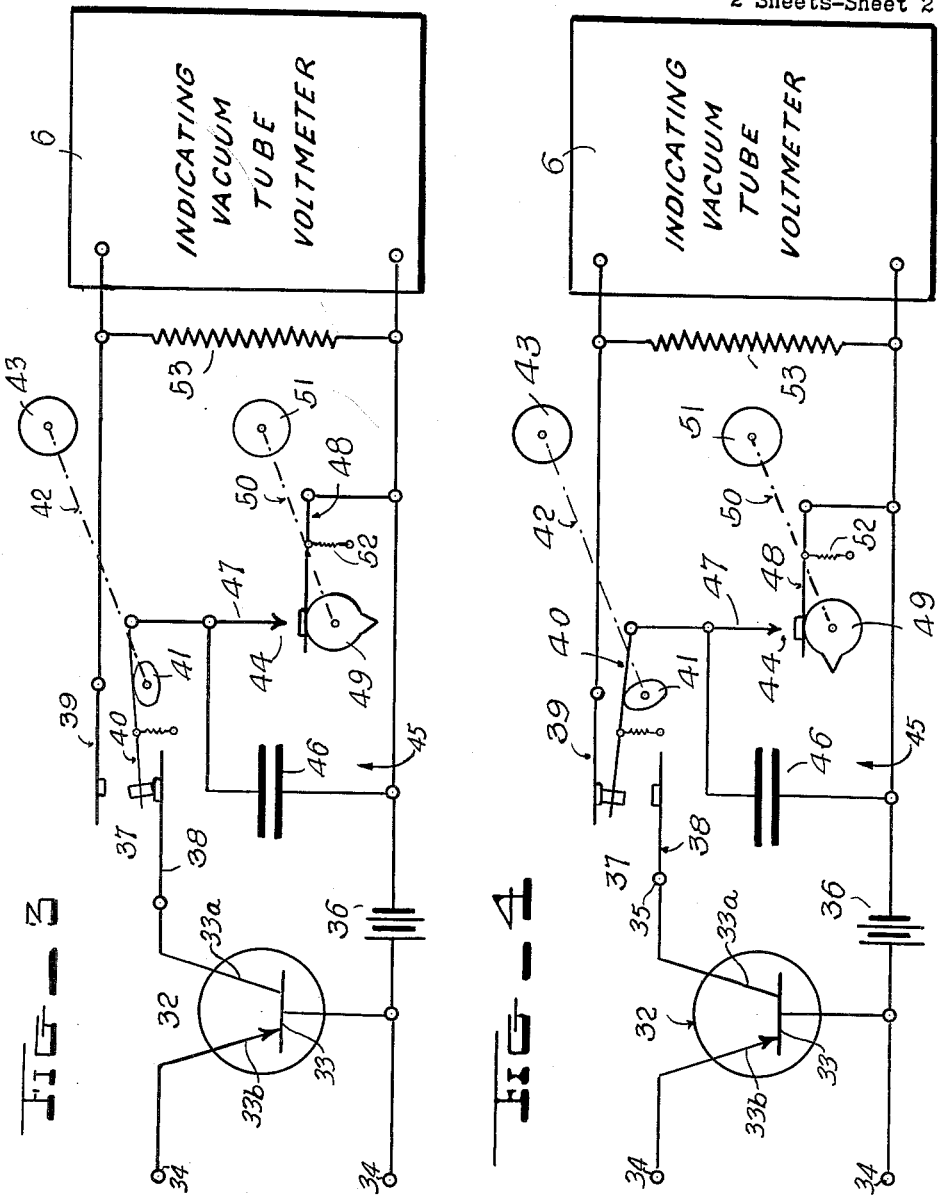

United States Patent Office 2,982,914
Patented May 2, 1961

2,982,914
NOISE METER

Kenneth C. Stewart, Peters Township, Washington County, Pa., assignor to Mine Safety Appliances Company, Pittsburgh, Pa., a corporation of Pennsylvania Filed Apr. 25, 1955, Ser. No. 503,483

4 Claims. (Cl. 324—111)

My invention relates broadly to measuring instruments, and more particularly to a noise meter for integrating, measuring and indicating amounts of noise according to units of time.

One of the objects of my invention is to provide a circuit arrangement for a noise meter by which sound energy is integrated and a record provided that is proportional to the hazard effects of a noisy environment in order that remedial steps may be taken for reducing the amount of noise.

Another object of my invention is to provide a noise meter circuit including means for producing unidirectional current flow proportional to the logarithm of an alternating potential to be measured in combination with current storage means and a direct current vacuum tube voltmeter having an input system responsive to the potential of the current storage means, and means for automatically and repeatedly interrupting the storage of current in the storage means, and discharging the current in the storage means into a measuring voltmeter.

The noise meter is composed of a transducer which converts airborne noise signals into alternating current. The alternating current so generated is distorted by the transducer sensitivity characteristics so that frequency components of the noisy environment are weighed according to their damaging effects. The distorted signals from the transducer are amplified, their logarithms taken, reamplified, and fed to an integrator for integration.

My invention will be more clearly understood by reference to the specification hereinafter following by reference to the accompanying drawings, in which:

Fig. 1 is a block diagram showing the noise meter of my invention;

Fig. 2 is a schematic circuit diagram showing the noise meter of my invention and indicating particularly the integration circuit in neutral position intermediate a condition in which the integration circuit is being charged and a position in which the integration circuit is being discharged;

Fig. 3 shows the integration circuit in the condition in which the circuit is being charged; and Fig. 4 illustrates the integration circuit in a condition of discharge into the indicating meter circuit.

My invention is directed to a circuit arrangement for integrating sound energy under conditions where the fluctuation of the sound energy with respect to time is rapid and does not lend itself to measurement with ordinary, inertia type, indicating devices. Examples of such sound energy are found in the noisy environment of factories. The purpose of making sound measurements in these environments is to better define the noise hazard problem, for the ear is absorbing energy and is damaged, at least in part, by the energy flow rate. Since previous instruments do not allow this determination, the best subjective estimate must be employed in determining this quantity.

The system of my invention provides means for (a) simultaneous rectification and integration of alternating input signals in a one stage circuit employing a junction type transistor, and (b) variable rate integration of unidirectional current in a circuit which charges a capacitor and operates so as to have (1) a linear charging function with time, (2) essentially no time constant, and (3) essentially no discharge of integration current during the integration cycle. The integrator provides means for automatic cyclic operation through the use of a mechanical timer and cam system which gives an integration time, a recording time, and a reset time.

Referring to the drawings in more detail, the noise meter is shown in Fig. 1 as including a microphone 1 connected with the input of an inverse feed back voltage linear amplifier indicated at 2, the output of which connects with the input circuit of a logarithmic attenuator indicated at 3. I use a logarithmic attenuator manufactured by Kalbfell Laboratories, Inc., San Diego, California, under the trade name "Logaten" (Model 410A). The output of the logarithmic attenuator 3 connects with the input circuit of the linear amplifier 4. The output of the linear amplifier 4 connects to the integrating circuit 5, which in turn connects to the receiver represented at 6.

As shown more clearly in Fig. 2, the microphone 1 connects to the input circuit of linear amplifier 2 through transformer 7 connected with the input circuit of the pentode 8 of the linear amplifier tube. The pentode 8 has its control grid 8a connected with one output terminal of the secondary winding of transformer 7 and its cathode 8b connected to the other terminal of the secondary winding of transformer 7 through resistor 9. An intermediate grid 8c in pentode 8 is connected through potential source 10 with the cathode circuit of pentode 8. A suppressor grid 8d is interposed between intermediate grid 8c and anode 8e. The output circuit of pentode 8 is coupled to the input circuit of a second amplifier stage constituted by pentode 11 through the circuit represented at 12.

The coupling circuit 12 connects to one terminal of resistor 14 in the anode circuit of pentode 8 and the cathode of pentode 8. The coupling circuit includes resistor 15 and condenser 16. A tap 17, adjustable on resistor 15, connects to the control grid 11a of pentode 11. The cathode 11b of pentode 11 connects through cathode resistor 18 to the grounded bus 13 and is shunted by condenser 19. A potential source 20 connects between the grounded bus 13 and the intermediate grid 11c. Suppressor grid 11d connects to the cathode 11b. A feed back path 21 connects between the output circuit of pentode 11 and the input circuit of pentode 8 and includes resistor 22, and condenser 23 connects between anode 11e of pentode 11 and cathode 8b of pentode 8. An output resistor 24 is included in the circuit of pentode 11 leading to anode 11e.

The logarithmic attenuator circuit in block 3 is indicated at 26 as including input terminals 27 and output terminals 29. The input terminals 27 are connected to the output of linear amplifier 2 through condenser 25 and B potential source 28. The output terminals 29 of the logarithmic attenuator 26 connect with the input of the linear amplifier 4 which contains pentode 30.

Pentode 30 includes control grid 30a and cathode 30b connected through the cathode resistor and condenser combination 30f with the output circuit 29 of the logarithmic attenuator 26. The intermediate grid 30c connects with anode 30e and to the primary circuit of output transformer 31. Suppressor grid 30d connects with cathode 30b. The output of linear amplifier 4 connects through transformer 31 to the input of the integrator circuit 5. The integrator circuit 5 includes the transistor 32 having input terminals 34 connected with output transformer 31 and having output terminals 35 connected through the B battery 36 to the storage or integrating circuit shown at 45. The effect of the B battery potential 36 connected with the base 33 on collector 33a is substantial with no input signal on the emitter 33b. This effect decreases with increasing input signal on emitter 33b. The storage or integrating circuit includes switches 37 and 44 and the condenser 46. The switch 37 consists of a lower leaf spring and contact 38 and a coacting upper leaf spring and contact 39 between which the intermediate leaf spring and double contact 40 is displaceable. A cam 41 operates to displace intermediate leaf spring and contact 40 alternately between the leaf springs and coacting contacts 38 and 37 from a normally spring biased position closing intermediate leaf spring and contact 40 with respect to the lower leaf spring and contact 38. The cam 41 is operated by rotatable shaft 42 by the constant speed drive means 43, whereby the intermediate leaf spring and contacts 40 are periodically and cyclically moved from contacting relation with lower leaf spring and contact 38 and upper leaf spring and contact 39. The intermediate leaf spring and contact 40 connects to the contact 47 of the switch 44 and coacts with the leaf spring and contact 48. The leaf spring and contact 48 is operated by a rotatable cam 49 moved by shaft 50 operated by the timing mechanism 51. The leaf spring and contact 48 is normally spring biased by spring 52 to a position tending to open the contact between leaf spring and contact 48 and contact 47. Thus as the high point of cam 49 revolves away from leaf spring and contact 48 in the positions for example as represented in Figs. 3 and 4 the circuit between leaf spring and contact 48 and contact 47 is open. The movement of the high point of cam 49 against the leaf spring and contact 48 closes the circuit between leaf spring and contact 48 and contact 47 as represented for example in Fig. 2. The output of the integrator 5 includes resistance 53 which connects across the input of the indicating vacuum voltmeter or recorder 6.

Noise signals fed to the transistor 32 undergo rectification and are delivered as unidirectional pulses to condenser 46 so long as intermediate leaf spring and contact 40 remains in connection with leaf spring and contact 38 which is a condition represented in Fig. 3. In this manner condenser 46 accumulates a charge during the time the mechanical timing mechanism of the integrator 5 maintains the switch 37 in the position illustrated in Fig. 3. At the end of a fixed time, determined by the operation of the cam 41 being driven from constant speed drive 43, cam 41 is displaced to the position illustrated in Fig. 4 breaking the connection between the intermediate leaf spring and contact 40 and the lower leaf spring and contact 38 and transferring the circuit connection between condenser 46 and the input terminals of the indicating vacuum tube voltmeter or recorder 6, all as represented in Fig. 4. A time interval is allowed of sufficient length to permit the visual reading of the indicating vacuum tube voltmeter or recorder 6, following which, the condenser 46 has its circuits returned to the neutral position represented in Fig. 2 to await discharge by operation of switch 44 under control of time mechanism 51. After the condenser 46 is discharged by the closing of leaf spring and contact 48, with respect to contact 47, as shown in Fig. 2, the terminals of condenser 46 are returned to the output of the transistor 32 as represented in Fig. 3 and the cycle of operation is repeated. The cycle of operation as described is entirely automatic and is controlled by the timing mechanism 51 operating through shaft 50 to control movement of cam 49. Since the logarithm of the noise signals is taken prior to integration, the charge entering condenser 46 is proportional to the logarithms of the noise strength. This has certain advantages in this application since the ear is logarithmically responsive to sound energy.

My invention makes use of a combination of means for producing unidirectional current flow proportional to the logarithm of an alternating potential to be measured and includes current storage means, a direct current vacuum tube voltmeter with input terminals responsive to the potential of the storage means and circuit means for automatically and repeatedly performing cyclic operations of: (1) interrupting the storage of current in the storage means; (2) transferring the connections of the storage means to the voltmeter; and, (3) thereafter discharging the storage means preparatory to the next succeeding operation.

While I have described my invention in one of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. An integrator circuit comprising a transistor having a base, a collector and an emitter, an input circuit connected between said emitter and said base, means for applying an alternating current to said input circuit, an output circuit connected between said collector and said base, a charge storage condenser, a measuring meter, a source of potential having one side thereof connected to the side of the output circuit connected to the base, the other side of said source of potential connected to one side of said charge storage condenser and one side of said measuring meter, the other side of said condenser connected to a switch arm, rotary drive means, a single pole double throw switch device including said switch arm, said switch arm of said single pole double throw switch cyclically driven by said rotary drive means alternately into connection with each of a pair of fixed contacts for alternately charging the charge storing condenser from said output circuit and applying the charge on said condenser across said measuring meter, one of said fixed contacts being connected with one side of said measuring meter, the other of said fixed contacts being connected with the side of the output circuit connected to the collector of said transistor, driving means operating in timed relation to said rotary drive means, a charge storage condenser discharge switch comprising a movable contactor connected to the one side of said charge storage condenser and a coacting fixed contact connected to said other side of said condenser, said movable contactor being operable by means rotatively driven by said driving means, and means coupled to said movable contactor and driven by said driving means for moving said movable contactor into connection with said coacting fixed contact for short-circuiting said charge storing condenser after each time period of connection of said condenser across said measuring meter by said single pole double throw switch device.

2. An integrator circuit as set forth in claim 1 in which a resistor is connected between said other side of said source of potential and the side of said measuring meter connected with one of said fixed contacts of said single pole double throw switch device.

3. An integrator circuit as set forth in claim 1 in which said single pole double throw switch device and said charge storage condenser discharge switch are each individually cam operated.

4. An integrator circuit comprising a charge storage condenser, a detector circuit having an output circuit, a measuring meter, a first cam operated switch for charging said charge storage condenser in its first position from the output of said detector circuit, said condenser being disconnected from said measuring meter when said first cam operated switch is in its first position, constant speed drive means for said cam operated switch, said first cam operated switch disposed to disconnect said condenser from the output of the detector circuit in its second position and to connect it across said measuring meter in said second position, a second cam operated switch connected in shunt with said charge storage condenser, a timed driving mechanism for said second cam operated switch and synchronized with said constant speed drive means, said second cam operated switch having an open and a closed position, and said timed driving mechanism being disposed to discharge said charge storage condenser by moving said second cam operated switch from the open to the closed position as said first cam operated switch moves from the second to the first position.

References Cited in the file of this patent

UNITED STATES PATENTS

| | | |
|---|---|---|
| 2,285,482 | Wunsch | June 9, 1942 |
| 2,473,542 | Philpott | June 21, 1949 |
| 2,511,868 | Newsom | June 20, 1950 |
| 2,582,851 | Ruge | Jan. 15, 1952 |
| 2,590,460 | Rackey et al. | Mar. 25, 1952 |
| 2,600,423 | Nolle | June 17, 1952 |
| 2,607,528 | McWhirter et al. | Aug. 19, 1952 |
| 2,750,547 | Wannamaker et al. | June 12, 1956 |
| 2,885,544 | Radcliffe | May 5, 1959 |

FOREIGN PATENTS

| | | |
|---|---|---|
| 609,381 | Great Britain | Sept. 29, 1948 |

OTHER REFERENCES

Stern et al.: Electrical Engineering, December 1954, pages 1107–1112.

Terman: Radio Engineering, Third Ed., published in 1947 by McGraw-Hill, N.Y., page 323.

Electronics Reference Sheet titled "Transistor Circuits," published in Electronics, December 1951, page 134.

"Kay-Lab-Logaten Logarithmic Attenuator," published by Kalbfell Laboratories, Inc., San Diego, California, in February 1952, 4 pages.